United States Patent
Prisament et al.

(10) Patent No.: US 12,350,832 B2
(45) Date of Patent: Jul. 8, 2025

(54) TRANSFERABLE REAL-TIME CLOCK FOR ROBOTICS CONTROL

(71) Applicant: Intrinsic Innovation LLC, Mountain View, CA (US)

(72) Inventors: Gregory J. Prisament, East Palo Alto, CA (US); Michael Beardsworth, San Francisco, CA (US); Asa Kaplan, San Francisco, CA (US); Karsten Knese, San Jose, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 349 days.

(21) Appl. No.: 17/885,384

(22) Filed: Aug. 10, 2022

(65) Prior Publication Data
US 2024/0051127 A1 Feb. 15, 2024

(51) Int. Cl.
*B25J 9/16* (2006.01)
*G06F 1/14* (2006.01)

(52) U.S. Cl.
CPC .............. *B25J 9/1628* (2013.01); *G06F 1/14* (2013.01)

(58) Field of Classification Search
CPC ......... B25J 9/1628; B25J 9/1602; G06F 1/14; G06F 1/12
See application file for complete search history.

(56) References Cited

U.S. PATENT DOCUMENTS

| | | | |
|---|---|---|---|
| 7,539,890 B2 | 5/2009 | Thibadeau | |
| 7,787,486 B2 | 8/2010 | Vestal | |
| 2005/0055132 A1* | 3/2005 | Matsumoto | ............ B25J 9/1682 700/245 |
| 2006/0168269 A1 | 7/2006 | Sather et al. | |
| 2012/0101798 A1 | 4/2012 | Vermeersch et al. | |
| 2019/0111560 A1* | 4/2019 | Neubauer | .............. B25J 9/0084 |
| 2021/0286754 A1* | 9/2021 | Foust | ...................... G06F 13/24 |

FOREIGN PATENT DOCUMENTS

| | | | | |
|---|---|---|---|---|
| CN | 112247985 A | * | 1/2021 | ............ B25J 9/1602 |
| EP | 1906283 | | 6/2013 | |

* cited by examiner

Primary Examiner — Rami R Okasha
(74) Attorney, Agent, or Firm — Fish & Richardson P.C.

(57) ABSTRACT

Methods, systems, and apparatus, including computer programs encoded on computer storage media, for a real-time robotics control framework that implements a real-time clock with transferable ownership. One of the systems being configured to operate a real-time control loop for a robot in multiple modes include a base mode and an augmented mode, wherein when operating the robot in the base mode, the system is configured to operate a base real-time control loop in which a start of each tick of the base real-time control loop is initiated by a real-time software control module, and wherein when operating the robot in the augmented mode, the system is configured to operate multiple real-time control loops comprising the base real-time control loop and a robot real-time control loop in which a start of each tick of the real-time control loop is initiated by the real-time software drive module.

18 Claims, 6 Drawing Sheets

TRANSFERABLE REAL-TIME CLOCK FOR
ROBOTICS CONTROL

BACKGROUND

This specification relates to frameworks for software control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation. Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position. In this specification, a workcell is the physical environment in which a robot will operate. Workcells have particular physical properties, e.g., physical dimensions that impose constraints on how robots can move within the workcell.

Due to such timing requirements, software control systems for physical machines are often implemented by closed software modules that are configured specifically for highly-specialized tasks. For example, a robot that picks components for placement on a printed circuit board can be controlled by a closed software system that controls each of the low-level picking and placing actions.

Each of these software modules may execute in one or more processes. Without proper synchronization of the real-time control logic across these processes, various issues and errors such as random phase offsets and beating effects may occur, hindering the performance of custom real-time control.

SUMMARY

This specification describes a real-time robotics control framework that implements a real-time clock with transferable ownership between different functional components of the framework. This transferability of clock ownership extends the capabilities of the framework for custom real-time control.

In this specification, a framework is a software system that allows a user to provide higher level program definitions while implementing the lower level control functionality of a real-time robotics system. In this specification, the operating environment includes multiple subsystems, each of which can include one or more real-time robots, one or more computing devices having software or hardware modules that support the operation of the robots, or both. The framework provides mechanisms for bridging, communication, or coordination between the multiple systems, including forwarding control parameters from a robot application system, providing sensor measurements to a real-time robotic control system for use in computing the custom action, and receiving hardware control inputs computed for the custom action from the real-time robotic control system, all while maintaining the tight timing constraints of the real-time robot control system, e.g., at the order of one millisecond.

Particular embodiments of the subject matter described in this specification can be implemented so as to realize one or more of the following advantages.

By enabling a particular software process among multiple software processes executing in different processes that collectively facilitate the custom real-time control to assume exclusive ownership of the clock, the real-time robotics control framework disclosed in this specification can establish clock synchronization across the multiple software processes, even in cases where the underlying software modules are provided by different entities, e.g., by different organizations, while additionally supporting a variety of timing models, e.g., based on the specifics of the robotic equipment, the needs of the custom action, or both.

Not only can this transferable clock ownership improve robotic task performance by ensuring determinism in timing various operations performed by the real-time robotics control framework, and thereby minimizing any undesired effects, such as uncontrolled phase offsets and beating effects which may in turn result in dropped messages or commands, but it can also allow testing and simulation to be performed more easily and with more accuracy than conventionally possible. Further, computational costs that are required for executing the control framework can be saved because the software processes need not be pinned to distinct processor cores for execution.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
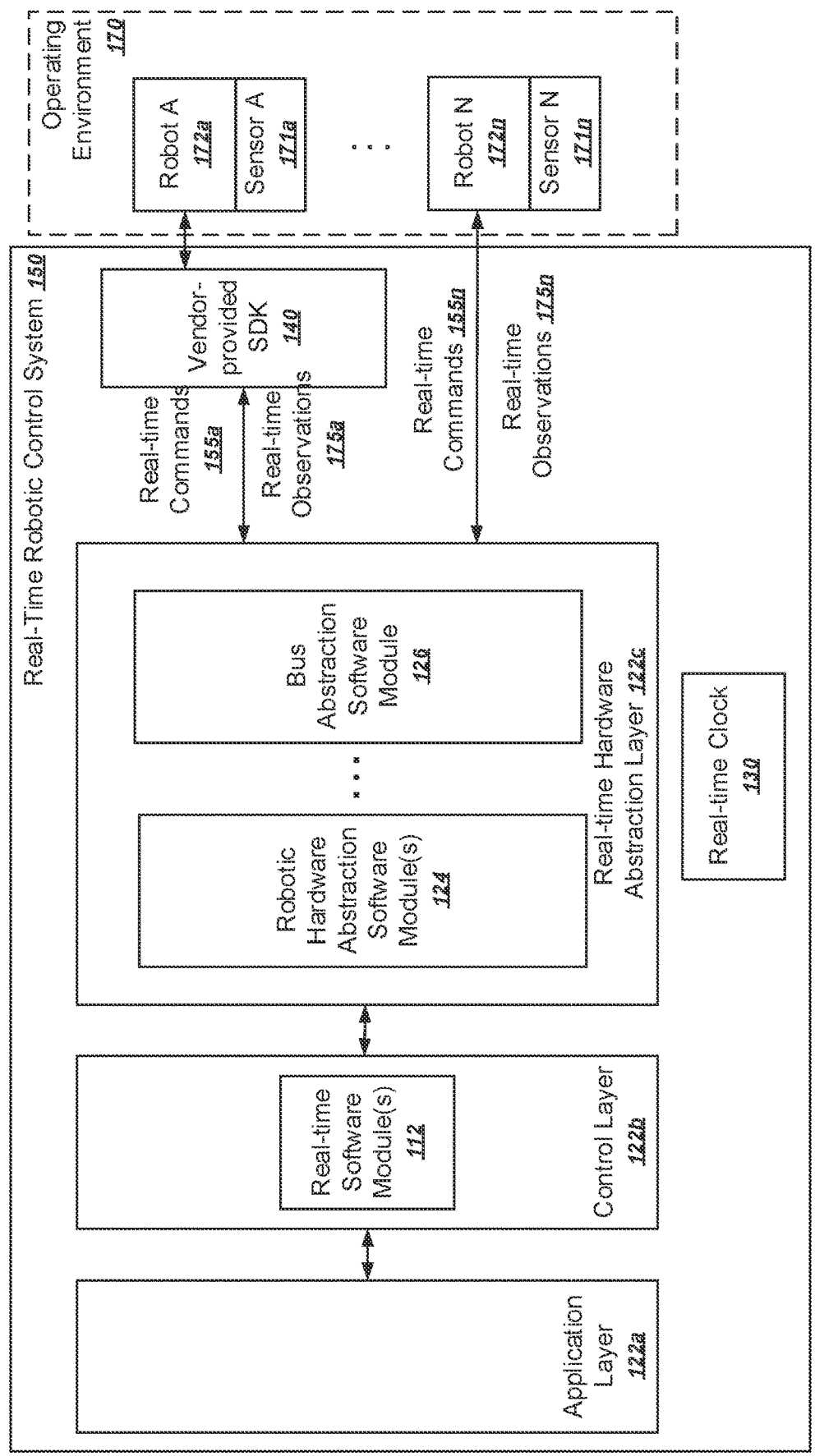
FIG. 1 is a diagram of an example system.

FIG. 1 is a diagram of an example system 100. The system 100 includes a real-time robotic control system 150 to drive multiple robots 172*a-n* in an operating environment 170. The system 100 includes a number of functional components that can each be implemented as computer programs installed on one or more computers in one or more locations that are coupled to each other through any appropriate communications network, e.g., an intranet or the Internet, or combination of networks.

The system 100 is an example of a system that can implement the real-time robotics control framework as described in this specification. In particular, the system 100 can provide a unified framework that allows users to achieve multiple different types of custom real-time control. In this specification, a robotic control system being described as being real-time means that it is required to execute within strict timing requirements to achieve normal operation. The timing requirements specify that certain actions must be executed or outputs must be generated within a particular time window in order for the system to avoid entering a fault state. For brevity, each time window may be referred to as a tick or a control tick. In the fault state, after a tick has elapsed without completing its required computations or actions, the system can halt execution or take some other action that interrupts normal operation, e.g., returning the robots to a starting pose or a fault pose.

Operations, e.g., processing steps for completing a task or function, in a non-real-time system are known as non-deterministic operations, which are not required to complete within a given tick to be successful. In contrast, a real-time system requires deterministic operations, which are required to occur every tick. In non-real-time and real-time systems, a scheduler may be utilized to determine the amount of resources, e.g., network bandwidth, memory, processor cycles, or a combination thereof, that an action is allotted for execution. If no or inadequate resources are allocated, the real-time system can also enter the fault state.

To control the robots 172a-n in the operating environment 170, the real-time robotic control system 150 provides commands, e.g., commands 155a-n, to be executed by one or more robots, e.g., robots 172a-n, in the operating environment 170. In order to compute the commands, the real-time robotic control system 150 consumes real-time observations 175a-n made by one or more sensors 171a-n gathering data within the operating environment 170. As illustrated in FIG. 1, each sensor 171 is coupled to a respective robot 172. However, the sensors need not have a one-to-one correspondence with robots and need not be coupled to the robots. In fact, each robot can have multiple sensors, and the sensors can be mounted on stationary or movable surfaces in the operating environment 170. Any suitable sensors 171 can be used, such as distance sensors, force sensors, torque sensors, cameras, to name just a few examples.

Generally, the real-time robotic control system 150 can provide commands through a control stack that handles providing real-time control commands 155a-n to the robots 172a-n. The control stack 122 can be implemented as a software stack that is at least partially hardware-agnostic. In other words, in some implementations the software stack can accept, as input, commands generated by the control system 150 without requiring the commands to relate specifically to a particular model of robot or to a particular robotic component.

The control stack 122 includes multiple levels, with each level having one or more corresponding software modules. In FIG. 1, the lowest level is the real-time hardware abstraction layer 122c which executes within strict real-time requirements, e.g., by providing a command at a first, fixed rate, e.g., every 5, 10, or 20 milliseconds, and the highest level is the application layer 122a which executes within non-real-time requirements, e.g., by providing a command at second, lower rate, which may sometimes be a varying rate or a rate that is sporadic, or both. Interposed between the non-real-time application layer 122a and the real-time hardware abstraction layer 122c is a control layer 122b, which handles bridging the boundary between the non-real-time commands generated by upper-level software modules in the control stack 122 and the real-time commands generated by the lower-level software modules in the control stack 122. More details of the control stack 122 are described in commonly owned U.S. patent application Ser. No. 17/246,082, which is herein incorporated by reference.

The control layer 122b serves as a bridging module in the control stack that translates each non-real-time command into data that can be consumed by real-time controllers that are responsible for generating low-level real-time commands. Such low-level real-time commands can, for example, relate to the actual levels of electrical current to be applied to robot motors and actuators at each point in time in order to effectuate the movements specified by the command.

The control layer 122b implements real-time software modules that facilitate various types of custom real-time control, including custom real-time action and custom real-time reaction. In this specification, an action refers to a motion having precomputed motion parameters, such as moving a tool on a robot arm from point A to point B. A reaction refers to a real-time switch between actions due to certain specified conditions, which can include sensor data that is updated in real-time.

Upon being provided with the definition of a custom real-time action, the control layer 122b can use this definition to produce continuous real-time control signals including, e.g., real-time positions, velocities, or torques for a robot component such as a robot joint, which determine how to drive the motors and actuators of the robots 172a-n in order to effectuate the custom real-time action. The continuous real-time control signals can then be consumed by the hardware abstraction layer 122c.

During execution of the custom real-time action, the hardware abstraction layer 122c provides an abstraction of the underlying hardware modules, e.g., a logical abstraction of the characteristics of the moveable components of the robots 172a-n, such that the complexity regarding the operations of the hardware modules are hidden from the upper-level software modules in the control stack 122, e.g., the software modules in the non-real-time application layer 122a, the real-time control layer 123b, or some combination of these.

In some implementations, the hardware abstraction layer 122c directly interfaces the robots 172a-n, e.g., by issuing real-time commands 155a-n to drive the movements of the moveable components such as joints of the robots 172a-n in the operating environment 170 to execute the custom real-time action. In other implementations, the hardware abstraction layer 122c is connected to a vendor-provided software development kit (SDK) 140, which in turn, actually interfaces the robots 172a-n. The SDK may include a set of software development tools provided by a vendor, e.g., a manufacturer of the robot, that assists in the creation of software modules for custom real-time control. The SDK may be the implementation of one or more application programming interfaces (APIs) in the form of libraries. For example, the vendor-provided SDK 140 can be an interface that enables fast and direct low-level bidirectional connection to the robot controller from an external computer.

In the example of FIG. 1, the real-time robotic control system 150 interfaces different robots, e.g., robot A 172a and robot 172n N, in the same operating environment 170 in different ways. However, in various cases, the system 150 may interface different robots in the same way, e.g., consistently through the vendor-provided SDK 140, or the system 150 may interface the same robot in different ways, e.g., when controlling the robot to effectuate different actions, e.g., through the vendor-provided SDK 140 for a first custom real-time action, and directly interfacing the robot for a second custom real-time action.

In this specification, a "hardware module" refers to a separate piece of hardware, including any means for moving the piece of hardware, that has a specific task or function within the system 100 and is usually programmed or programmable by software or firmware or by a user establishing specific settings to achieve a specific task or function. For example, a hardware module can be a physical robotic hardware element, e.g., a moveable component such as a joint of a robot (including the means for moving the joint, e.g., an actuator or a motor). As another example, a hardware module can be a peripheral device in the operating environment 170, e.g., a protocol-based interconnection device. Example protocol-based interconnection devices include Industry Standard Architecture (ISA) bus, Extended ISA bus, Peripheral Components Interconnect (PCI) bus, PCI Express bus, Serial AT Attachment (SATA) bus, Hyper-Transport (HT) bus, USB (Universal Serial Bus) bus, Thunderbolt bus, IEEE 1394 interface (FireWire) bus, and the like that can be configured to couple functional components of system to each other.

In this specification, a "software module" refers to a separate unit of software programming code that has a specific task or function within the system 100. A software module may handle one step in a process or may handle a series of related steps required for completing a task or function. A software module may execute in a single process or thread, or may alternatively execute across multiple processes or threads.

For example, a real-time software module 112 residing at the control layer 122b can implement user-defined custom control logic for switching execution of actions in real time, e.g., when user-defined condition is satisfied, the real-time control layer will automatically and in real time switch to performing the second action from the first action. In this example, the real-time software module 112 need not wait for confirmation or an instruction from a higher-level controller to begin execution of the second action.

As another example, a robotic hardware abstraction software module 124 residing at the hardware abstraction layer 122c can include software programming code for controlling a hardware module, e.g., a moveable component such as a joint of a robot, within the operating environment 170 by issuing real-time commands to drive the movements of the hardware module to follow a target trajectory. The robotic hardware abstraction software module 124 abstracts the real-time commands for the hardware module by manifesting characteristics and capabilities of the underlying hardware module. As another example, a bus abstraction software module 126 residing at the hardware abstraction layer 122c can function as a single application program interface (API) to send messages over a plurality of different buses and/or networks, and support a device class, regardless of the bus type or protocol. For example, the bus abstraction software module 126 can specify a manner that upper-level software modules in the control stack 122 can employ the buses and/or networks and interact therewith, without knowing the specifics of the bus or network technology.

In this specification, real-time control being custom means a user can specify such custom real-time control information by writing user code, configuration files, or both. In other words, some of all of the constituent software modules, including software modules 112, 124, and 126 mentioned above, as well as the configuration files according to which these software modules can be configured, which are used to facilitate custom real-time control may be developed by a user, e.g., through an integrated development environment (IDE) provided by the system 100. The real-time robotic control system 150 is then configured to control the robots 172a-n in the operating environment 170 according to the custom real-time control information.

In addition, various parts of the custom real-time control information can be provided by different users belonging to different organizations. The real-time robotics control framework thus allows users to easily supply their own real-time control of the robot without relying on the robot manufacturer or the organization who initially set up the installation. For example, the software modules residing at the control layer 122b may be provided by a third-party developer who develops custom actions for various technical use cases, while the software modules residing at the hardware abstraction layer 122c may be provided by the equipment manufacturer of the robotic hardware.

The real-time robotic control system 150 includes a real-time clock object 130, which can be associated with a processor of the system, that provides an internal timing reference for operations of the functional components of the real-time robotic control system 150, e.g., by identify a current time and determining an interval that corresponds to the current time. The clock object 130 can also be used for any other time keeping purposes, e.g., for timing the simulation of performance of the hardware modules of the system, or for timing the testing such as the debugging routine of the software modules of the system.

At any time point of performing custom real-time control, the real-time robotic control system 150 would need to simultaneously execute multiple processes, for example one process corresponding to one or more of the software modules mentioned above, and usually more. Without proper process management, various issues and errors may occur, hindering the performance of custom real-time control.

Figure 2:
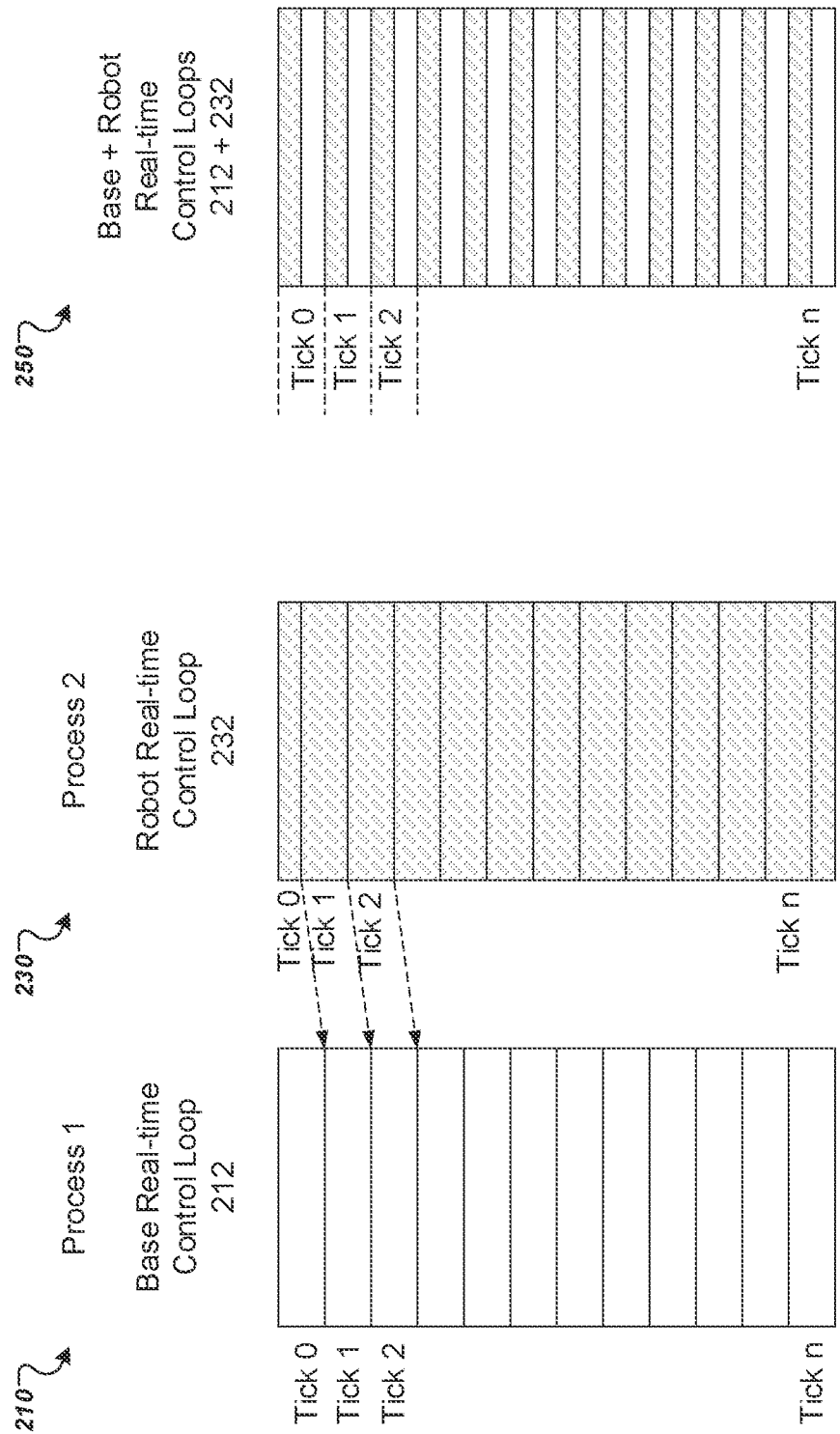
FIG. 2A illustrates an example of running multiple processes that correspond to respective real-time control loops of an example system.
FIG. 2B illustrates an example of running one combined process that correspond to respective real-time control loops of an example system.

FIG. 2A illustrates an example of running multiple processes that correspond to respective real-time control loops of an example system. As illustrated, the system simultaneously runs a first process 210 and a second process 230, which corresponds to a base real-time control loop 212 and a robot real-time control loop 232, respectively. In the base real-time control loop 212, the multiple software modules (referred to below as "real-time software control modules") that reside at the control layer 122b or the hardware abstraction layer 122c of the real-time robotic control system 150 are executed repeatedly in a predetermined sequence in order to provide the real-time commands 155a to effectuate the custom real-time action. In the robot real-time control loop 232, the multiple software modules (referred to below as "real-time software drive modules") exposed through the SDK that drive the control mechanisms of the robots are executed repeatedly in a predetermined sequence in order to actually drive the movements of the moveable components such as joints of the robots 172a-n in the operating environment 170.

A first issue that may arise in the example of FIG. 2A is that the two processes 210 and 230 may not be synchronized to start running at the same time, e.g., due to random phase offset. Namely the start time of each tick, e.g., tick 0, of the base real-time control loop 212 may not be the same as that of each tick of the robot real-time control loop 232. A second issue is that beating effect, which may in turn result in dropped messages or commands, may occur if the two processes are actually running at slightly different frequencies. For example, two processes running at 1000 Hz and 1001 Hz, respectively, could beat at 1 Hz. A third issue is that the twos processes need to be pinned to distinct processor cores for execution.

To avoid such non-determinism in timing the process execution as well as any undesired effects associated with it, the real-time robotic control system 150 runs a single process that effectively combines both the base real-time control loop 212 and the robot real-time control loop 232. In other words, rather than adopting additional protocols or other mechanisms in an attempt to achieve synchronization across multiple different processes, e.g., by synchronizing the respective clock of each process with one another, as has been done more commonly, the system 150 described in this specification achieves synchronization across the multiple processes with minimal overhead by running these processes in one single process.

FIG. 2B illustrates an example of running one combined process that correspond to respective real-time control loops of an example system. As illustrated, the system simultaneously runs one single combined process 250, which effectively combines both the base real-time control loop 212 and the robot real-time control loop 232. When running the combined process 250, each tick in the base real-time control loop 212 is made to align with a corresponding tick in the robot real-time control loop 232, where the start of each tick, e.g., tick 0, of both real-time control loops is initiated by a real-time software drive module exposed through the SDK that drives the control mechanisms of the robots. Both the base real-time control loop 212 and the robot real-time control loop 232 are executed on each initiated tick.

The software modules included in the base real-time control loop 212 and the robot real-time control loop 232 can thus have a common understanding of time, as provided by the real-time clock object 130. Further, the system can utilize the common understanding of time to effectuate the custom real-time action in accordance with any of a variety of timing models, e.g., based on the specifics of the robotic equipment, the needs of the custom action, or both.

Figure 3:
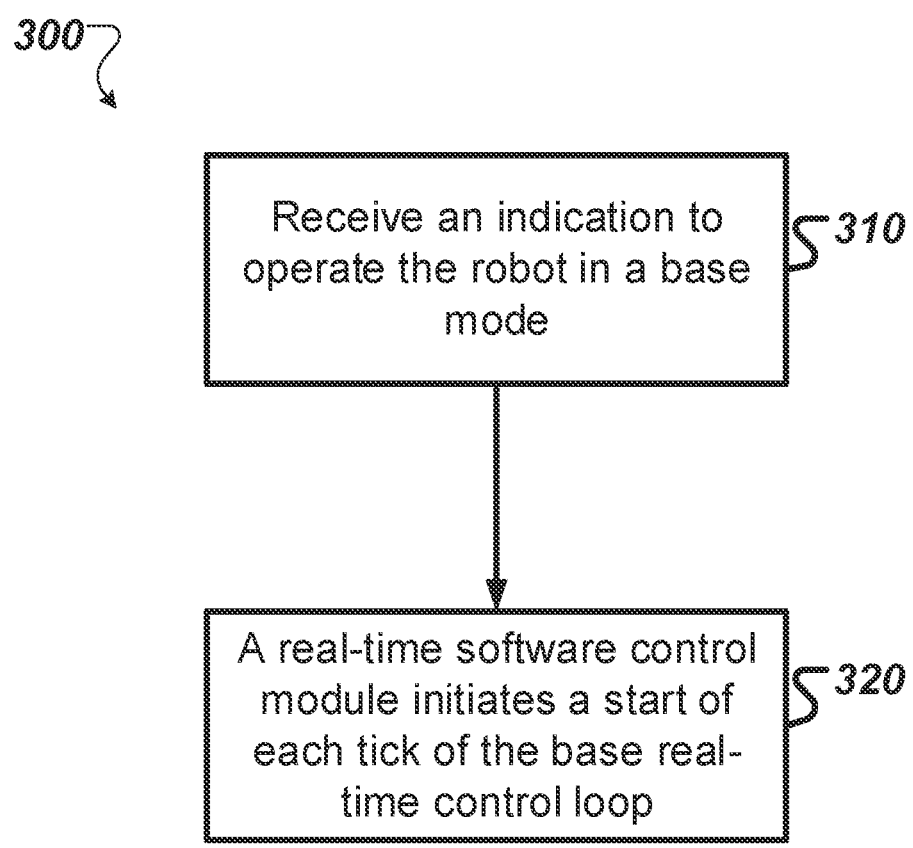
FIG. 3 is a flowchart of an example process for operating a robot in a base mode.

FIG. 3 is a flowchart of an example process 300 for operating a robot in a base mode. The process 300 can be implemented by one or more computer programs installed on one or more computers and programmed in accordance with this specification. For example, the process 300 can be performed by the real-time robotic control system 150 shown in FIG. 1. For convenience, the process 300 will be described as being performed by a system of one or more computers.

The system receives an indication to operate in a base mode (310). The system can operate in the base mode in the implementations where the hardware abstraction layer directly interfaces the robot, i.e., without being connected to a vendor-provided software development kit (SDK). For example, this indication to operate in the augmented mode may be in the form of a request that is generated by a user of the system. As another example, this indication may alternatively be a request submitted by a software module, e.g., the real-time software control module that reside at the control layer or the hardware abstraction layer of the system. In either example, the system may receive the request in cases where the custom real-time control involves hardware modules that are directly coupled to the system over a network, e.g., an Ethernet for Control Automation Technology (EtherCAT) network, through which real-time commands can be provided.

Upon receiving the indication to operate in the base mode, the system begins a process (or thread) to operate a base real-time control loop (320) in which the multiple real-time software control modules residing at either the control layer or the hardware abstraction layer of the system are executed repeatedly in a predetermined sequence in order to provide the real-time commands to effectuate a custom real-time action. In the base real-time control loop, a start of each tick of the base real-time control loop is initiated by a real-time software control module, which can be any one of the software control modules that are being executed in the base real-time control loop, that is separate from the real-time software drive modules exposed through the SDK that drives the control mechanisms of the robot. The real-time software control module can initiate the start of each tick by making a function call to a real-time clock object of the system. In other words, when operating in the base mode, the real-time software control module, and not the real-time software drive module, assumes ownership of the real-time clock object of the system. The real-time clock object can then be used for timing every tick of the base real-time control loop.

Figure 4:
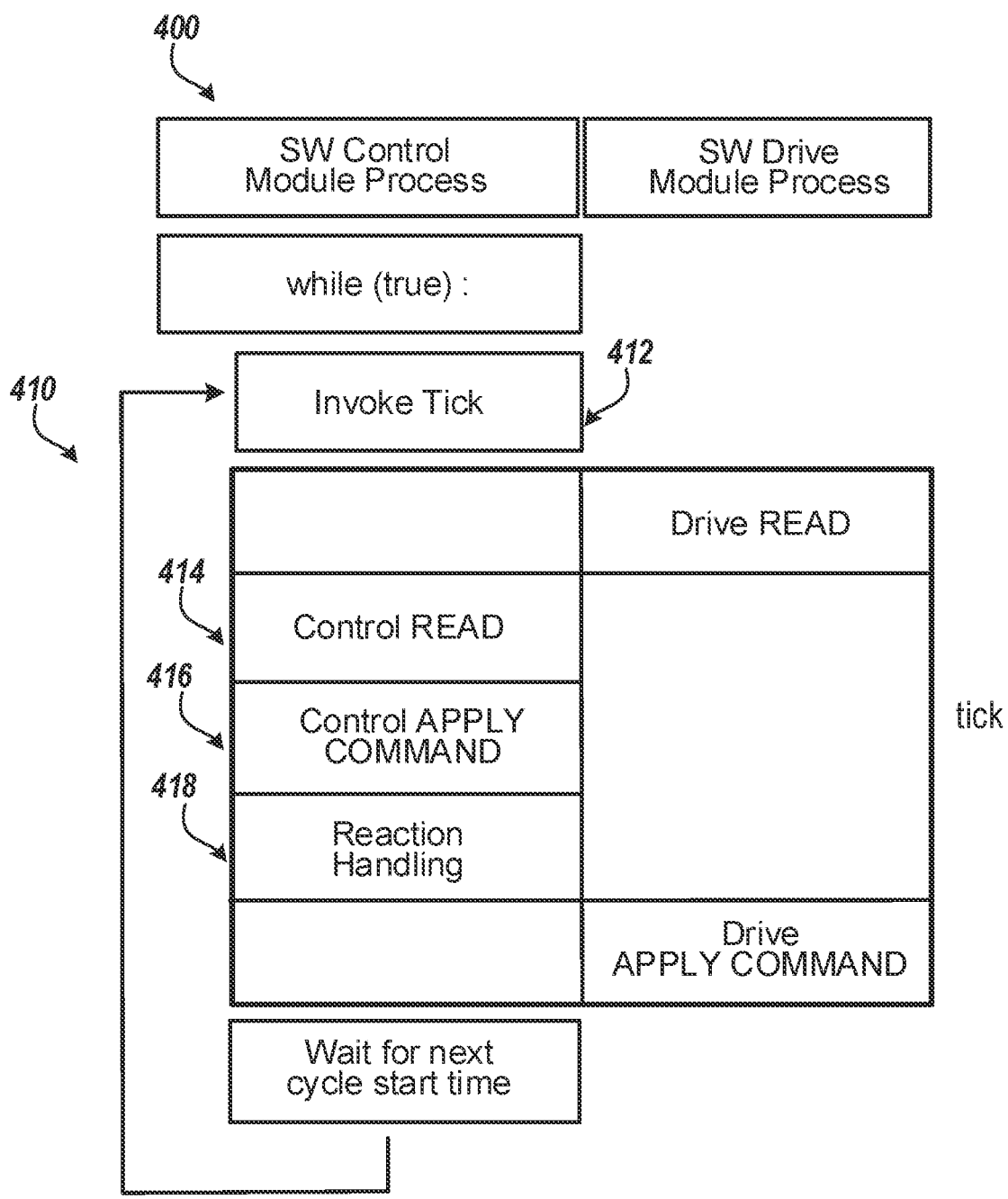
FIG. 4 illustrates an example of operating a robot in a base mode.

FIG. 4 illustrates an example of operating a robot in a base mode. Operation of the system in the base mode includes operating a base real-time control loop 410 in which the multiple real-time software control modules are executed repeatedly in a predetermined sequence. The system can run base real-time control loop 410 in a first process ("SW Control Module Process") 400.

During execution, the system executes the real-time software control modules in the order shown by the base real-time control loop 410. As illustrated, the base real-time control loop begins with the invocation operation 412 of the real-time clock object to initiate a tick of the base real-time control loop. By performing the base real-time control loops 410, the system can repeatedly, i.e., at each of multiple ticks, read sensor values, apply current actions, and/or update the current actions (according to any custom reaction that is satisfied).

Following the clock invocation operation 412 is a read operation 414, which can be performed by a software module executing at the hardware abstraction layer. By performing the read operation, the software module executing at the hardware abstraction layer can read the hardware-agnostic signals generated by the moveable components of the robot, the updated sensor values, or both and possibly more. For example, the hardware-agnostic signals can include joint angles, and the sensors values can include values generated by distance sensors, force sensors, torque sensors, or cameras making observations within the operating environment.

The read data can then be used by the software modules executing at the hardware abstraction layer to control the one or more robots. The SW Control Module Process 400 can then use the read data for online motion generation and control. Specifically, a software module that executes at the hardware abstraction layer performs an apply operation 416 to effectuate a custom real-time action, e.g., by issuing real-time, hardware-agnostic commands to drive the movements of the moveable components such as joints of the robot in the operating environment. For example, the hardware-agnostic commands can include goal joint positions for the next incremental movement step to effectuate the custom real-time action.

The read data can additionally be used by the software modules executing at the control layer to handle real-time reactions, i.e., switching between the executions of actions in real-time. Specifically, when the read data satisfies a custom condition, the real-time control layer performs a handling operation 418 to automatically and in real time switch to performing a next action from the current action.

The SW Control Module Process 400 then proceeds to perform the next base real-time control loop 410 for the current action, or alternatively transitions to the base real-time control loop 410 for the next action. In either case, the real-time control system can re-perform the base real-time control loop 410 (return to clock invocation operation 412).

Figure 5:
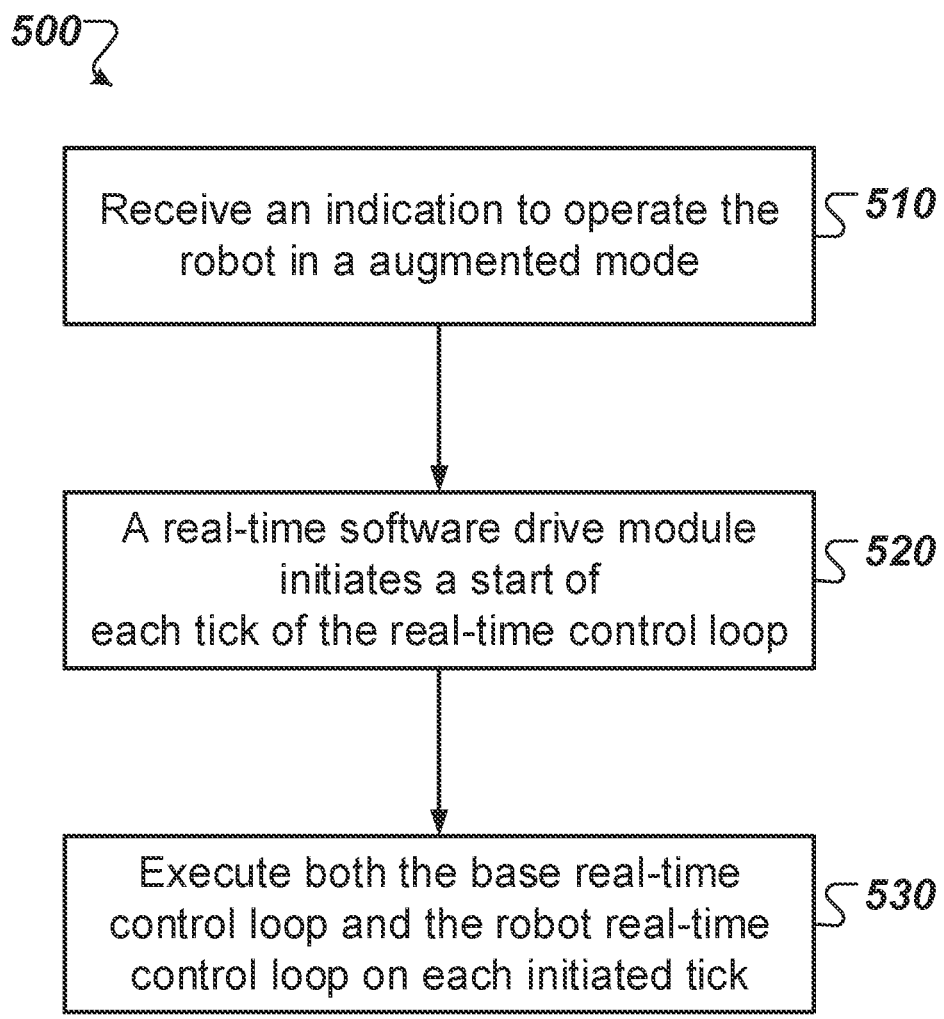
FIG. 5 is a flowchart of an example process for operating a robot in an augmented mode.

FIG. 5 is a flowchart of an example process 500 for operate a real-time control loop for a robot in an augmented mode. The process 500 can be implemented by one or more computer programs installed on one or more computers and programmed in accordance with this specification. For example, the process 500 can be performed by the real-time robotic control system 150 shown in FIG. 1. For convenience, the process 500 will be described as being performed by a system of one or more computers.

The system receives an indication to operate in an augmented mode (510). The system can operate in the augmented mode in the implementations where the hardware abstraction layer is connected to the vendor-provided software development kit (SDK), i.e., instead of directly interfacing the robots. For example, this indication to operate in the augmented mode may be in the form of a request that is generated by a user of the system. As another example, this indication may alternatively be a request submitted by a software module, e.g., the software module exposed through the SDK that drive the control mechanisms of the robots. In either example, the system may receive the request in cases where the custom real-time control makes use of the vendor-provided SDK and/or during simulation of a custom hardware module.

In some implementations, the indication to operate in the augmented mode follows the indication to operate in the base mode. That is, the system may initiate execution in the base mode in which the clock object is owned by the real-time software control module and then transition to executing in the augmented mode in which ownership of the clock object is transferred to the real-time software drive module. In some implementations, the ownership of the clock object can be an exclusive ownership, and the clock object is owned by different software modules in the different operating modes. In some implementations, the real-time software control module of the system can be configured to re-claim ownership of clock object from a software drive module at the time of any hardware failure of the robotic hardware element that corresponds to the software drive module. This ensures the efficiency as well as the safety of the custom real-time control because the remaining functional components may resume normal operation in accordance with the timing requirements while the issue that caused the hardware failure is being resolved.

Upon receiving the indication to operate in the augmented mode, the system begins a process (or thread) to operate multiple real-time control loops including the base real-time control loop and a robot real-time control loop (520). In the robot real-time control loop, the multiple software modules exposed through the SDK that drive the control mechanisms of the robots are executed repeatedly in a predetermined sequence in order to actually drive the movements of the moveable components such as joints of the robot in the operating environment.

When operating in the augmented mode, a start of each tick of the multiple real-time control loops is initiated by the real-time software drive module, which can any one of the software drive modules that are being executed in the robot real-time control loop, that drives the control mechanisms of the robot. In addition, both the base real-time control loop and the robot real-time control loop are executed on each initiated tick.

The real-time software drive module can initiate the start of each tick by making a function call to the real-time software control module through the callback function implemented by the real-time software drive module. Upon being invoked through callback, the real-time software control module then makes a function call to the same clock object as in step 320. In this way, the ownership of the clock object is effectively passed from the real-time software control module to the real-time software drive module, which now assumes ownership of the clock object. The real-time clock object can then be used for timing every tick of both the base real-time control loop and the robot real-time control loop.

TABLES 1-3 include examples of programming code that can be deployed at the system to facilitate the operation in the augmented mode. Once deployed, the programming code in the examples of TABLES 1-3 can constitute a part of the bus abstraction software module that resides at the hardware abstraction layer included in the control stack.

TABLE 1

| 1 | <loop name="my_loop" bus_driven="my_bus" |
| 2 | priority="REALTIME_NORMAL_1"> |
| 3 | </loop> |

In TABLE 1, a real-time control loop initiated by the bus abstraction software module is added to the bus abstraction software module.

TABLE 2

| 1 | Bus::Init(..., const SchedulerInfo& info, ...) { |
| 2 | step_func__ = info.step_func; |
| 3 | ... |
| 4 | } |

In TABLE 2, a step function object is passed to the initialization function of the bus abstraction software module.

TABLE 3

| 1 | Bus::Init(..., const SchedulerInfo& info, ...) { |
| 2 | ... |
| 3 | robot__->control(this, &info](constRobotState& state, |
| 4 | Duration duration) { |
| 5 | // Copy (encoder) state to devices. |
| 6 | ... |
| 7 | |
| 8 | // Step controllers. |
| 9 | info.step_func( ); |
| 10 | |
| 11 | // Copy (motion target) from devices. |
| 12 | return motion_target; |
| 13 | } |
| 14 | } |

In TABLE 3, upon being invoked through callback by the real-time software drive module, the bus abstraction software module initiates a tick of the real-time control loop by utilizing the step function object (line 9).

In some implementations, in addition to initiating the tick of the real-time control loop, the bus abstraction software module can also be configured to step the simulator which models a simulated robot and/or a simulated operating environment at an arbitrary rate, e.g., a fastest possible rate, a non-uniform rate, or a multiple of wall-clock time, that may be slower or faster than the actual rate at which data is collected in real world. This additional capability makes the simulation of various functional components of the system easier and more accurate.

Figure 6:
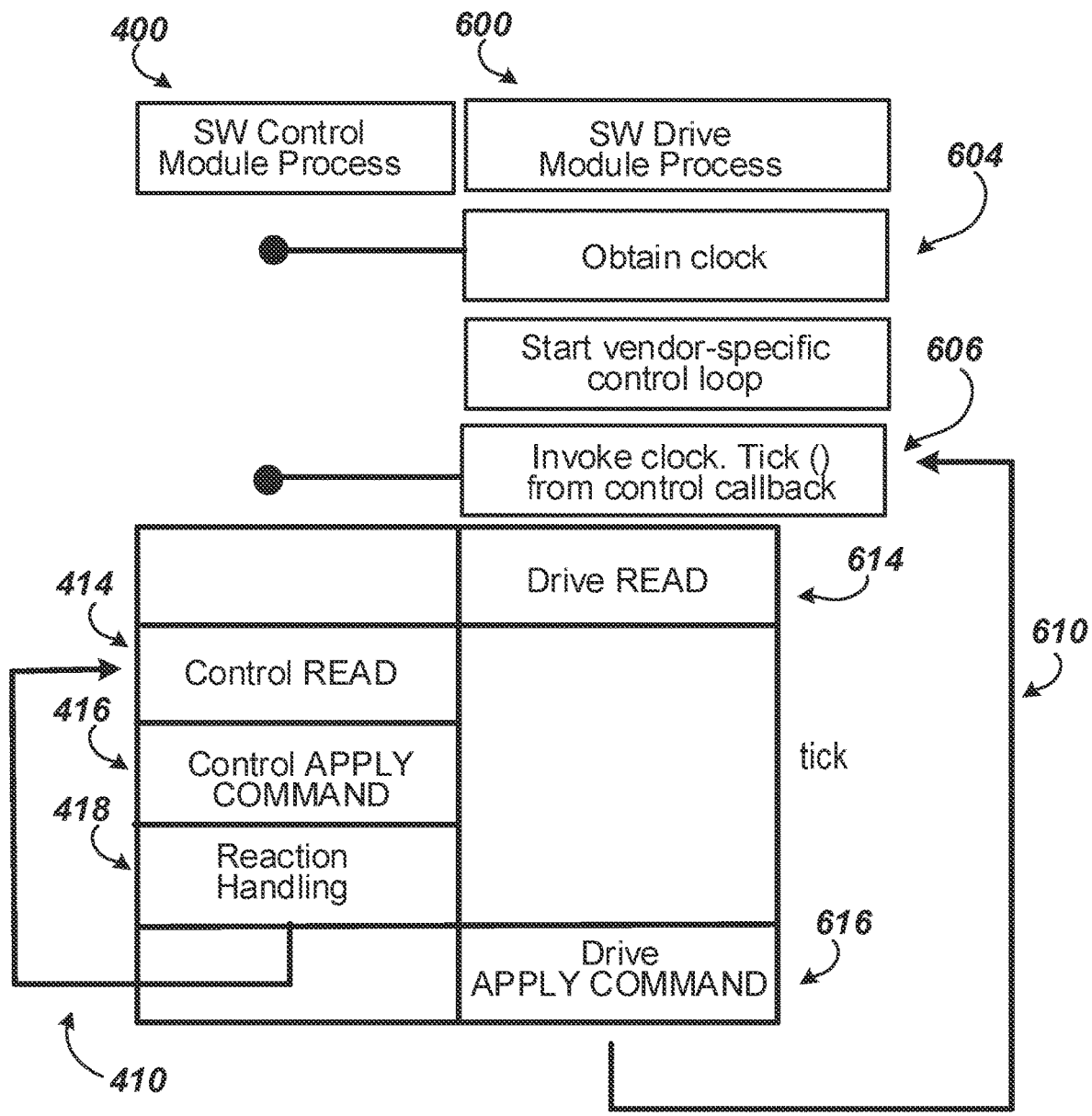
FIG. 6 illustrates an example of operating a robot in an augmented mode.

FIG. 6 illustrates an example of operating a robot in an augmented mode. Operation of the system in the augmented mode includes operating multiple real-time control loops that include a base real-time control loop 410 and a robot real-time control loop 610. In particular, the system can run both real-time control loops 410 and 610 in one single process which effectively combines both a first process ("SW Control Module Process") 400, which corresponds to the base real-time control loop 410, and a second process ("SW Drive Module Process") 600, which corresponds to the robot real-time control loop 610. During execution, the system executes the real-time software control modules in the order shown by the base real-time control loop 410, and executes the real-time software drive modules in the order shown by the robot real-time control loop 610.

As illustrated, when operating in the augmented mode, a real-time software drive module, which can for example be the bus abstraction software module that resides at the hardware abstraction layer of the system, claims ownership 604 of the clock object. To begin the robot real-time control loop 610, the real-time software drive module invokes the real-time clock object to initiate a tick of the robot real-time control loop 610. The invocation operation 606 can include calling a callback function implemented by the real-time software drive module to trigger the real-time software control module to call to the clock object to initiate the tick.

On each tick, the robot real-time control loop 610 is executed before executing the base real-time control loop 410. The robot real-time control loop 610 handles hardware-specific communications. That is, the real-time software drive module first performs a read operation 614 to read hardware-specific signals, e.g., robot encoder status, over EtherCAT or some other communication network, and then translate this data into the hardware-agnostic signals, e.g., in the form of an array of joint angles, and then calls the real-time control software control module to execute the base real-time control loop 410.

In the base real-time control loop 410, a read operation 414, an apply operation 416, and a reaction handling operation 418 are sequentially performed, as similarly described above with reference to FIG. 4.

Following the completion of the base real-time control loop 410 is an apply operation 616 in the robot real-time control loop 610. The apply operation 616 is performed by the real-time software drive module to actually drive the movements of the moveable components of the robot in the operating environment in accordance with the real-time, hardware-agnostic commands generated by the SW Control Module Process 400. For example, the apply operation 616 receives the hardware-agnostic joint commands and generates motor torque commands to be provided to the robot over EtherCAT.

The combined process of both SW Control Module Process 400 and SW Drive Module Process 600 then proceeds to perform the next robot real-time control loop 610 for the current action, or alternatively transitions to the robot real-time control loop 610 for the next action. In either case, the real-time control system can re-perform the robot real-time control loop 610 (return to clock invocation operation 606).

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a real-time robotics control system comprising one or more computers, the real-time robotics control system being configured to operate multiple real-time control loops for a robot in multiple modes including a base mode and an augmented mode,
    wherein when operating the robot in the base mode, the system is configured to operate a base real-time control loop in which a start of each tick of the base real-time control loop is initiated by a real-time software control module that is separate from a real-time software drive module that drives the control mechanisms of the robot, and
    wherein when operating the robot in the augmented mode, the system is configured to operate the multiple real-time control loops comprising the base real-time control loop and a robot real-time control loop in which a start of each tick of the multiple real-time control loops is initiated by the real-time software drive module that drives the control mechanisms of the robot and wherein both the base real-time control loop and the robot real-time control loop are executed on each initiated tick.

Embodiment 2 is the real-time robotics control system of embodiment 1, wherein when operating in the augmented mode the real-time software drive module calls the real-time software control module to execute the base real-time control loop.

Embodiment 3 is the real-time robotics control system of any one of embodiments 1-2, wherein on each tick, the robot real-time control loop is executed before executing the base real-time control loop.

Embodiment 4 is the real-time robotics control system of any one of embodiments 1-3, wherein initiating the start of each tick of the real-time control loop comprises calling a function of a same clock object.

Embodiment 5 is the real-time robotics control system of embodiment 4, wherein the clock object is owned by different software modules in different operating modes Embodiment 6 is the real-time robotics control system of any one of embodiments 4-5, wherein the real-time robotics controls system is configured to initiate execution in the base mode in which the clock object is owned by the real-time software control module and to then transition to executing in the augmented mode in which ownership of the clock object is transferred to the real-time software drive module.

Embodiment 7 is a method comprising the operations that the real-time robotics control system of any one of claims 1-6 is configured to perform.

Embodiment 8 is a computer storage medium encoded with a computer program, the program comprising instructions that are operable, when executed by data processing apparatus, to cause the data processing apparatus to perform the method of any one of embodiments 1 to 6.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A robotics control system comprising one or more computers, the robotics control system being configured to operate multiple control loops for a robot in multiple modes including a base mode in which the system operates the robot using a software stack, and an augmented mode in which the system operates the robot using the software stack and a control interface,
    wherein when operating the robot in the base mode, the system is configured to operate a base control loop in which a start of each tick of the base control loop is initiated by a software control module included in the software stack, wherein the software control module is separate from a software drive module that is exposed through the control interface and that drives control mechanisms of the robot, and
    wherein when operating the robot in the augmented mode, the system is configured to operate the multiple control loops comprising the base control loop and a robot control loop in which a start of each tick of the multiple control loops is initiated by the software drive module that is exposed through the control interface and that drives the control mechanisms of the robot and wherein both the base control loop and the robot control loop are executed on each initiated tick.

2. The robotics control system of claim 1, wherein when operating in the augmented mode the software drive module calls the software control module to execute the base control loop.

3. The robotics control system of claim 2, wherein on each tick, the robot control loop is executed before executing the base control loop.

4. The robotics control system of claim 1, wherein initiating the start of each tick of the base control loop comprises calling a function of a same clock object.

5. The robotics control system of claim 4, wherein the clock object is owned by different software modules in different operating modes.

6. The robotics control system of claim 4, wherein the robotics controls system is configured to initiate execution in the base mode in which the clock object is owned by the software control module and to then transition to executing in the augmented mode in which ownership of the clock object is transferred to the software drive module.

7. A method performed by a robotics control system comprising one or more computers, the robotics control system being configured to operate multiple control loops for a robot in multiple modes including a base mode in which the system operates the robot using a software stack, and an augmented mode in which the system operates the robot using the software stack and a control interface, wherein the method comprises:
    when operating the robot in the base mode, operating a base control loop in which a start of each tick of the base control loop is initiated by a software control module included in the software stack, wherein the software control module is separate from a software drive module that is exposed through the control interface and that drives control mechanisms of the robot, and
    when operating the robot in the augmented mode, operating the multiple control loops comprising the base control loop and a robot control loop in which a start of each tick of the multiple control loops is initiated by the software drive module that is exposed through the control interface and that drives the control mechanisms of the robot and wherein both the base control loop and the robot control loop are executed on each initiated tick.

8. The method of claim 7, wherein when operating in the augmented mode the software drive module calls the software control module to execute the base control loop.

9. The method of claim 8, wherein on each tick, the robot control loop is executed before executing the base control loop.

10. The method of claim 7, wherein initiating the start of each tick of the base control loop comprises calling a function of a same clock object.

11. The method of claim 10, wherein the clock object is owned by different software modules in different operating modes.

12. The method of claim 10, wherein the robotics controls system is configured to initiate execution in the base mode in which the clock object is owned by the software control module and to then transition to executing in the augmented mode in which ownership of the clock object is transferred to the software drive module.

13. A computer storage medium encoded with a computer program, the program comprising instructions that are operable, when executed by data processing apparatus, to cause the data processing apparatus to implement a robotics control system configured to operate multiple control loops for a robot in multiple modes including a base mode in which the system operates the robot using a software stack, and an augmented mode in which the system operates the robot using the software stack and a control interface, wherein when operating the robot in the base mode, the system is configured to operate a base control loop in which a start of each tick of the base control loop is initiated by a software control module included in the software stack, wherein the software control module is separate from a software drive module that is exposed through the control interface and that drives control mechanisms of the robot, and wherein when operating the robot in the augmented mode, the system is configured to operate the multiple control loops comprising the base control loop and a robot control loop in which a start of each tick of the multiple control loops is initiated by the software drive module that is exposed through the control interface and that drives the control mechanisms of the robot and wherein both the base control loop and the robot control loop are executed on each initiated tick.

14. The computer storage medium of claim 13, wherein when operating in the augmented mode the software drive module calls the software control module to execute the base control loop.

15. The computer storage medium of claim 14, wherein on each tick, the robot control loop is executed before executing the base control loop.

16. The computer storage medium of claim 13, wherein initiating the start of each tick of the base control loop comprises calling a function of a same clock object.

17. The computer storage medium of claim 16, wherein the clock object is owned by different software modules in different operating modes.

18. The computer storage medium of claim 16, wherein the robotics controls system is configured to initiate execution in the base mode in which the clock object is owned by the software control module and to then transition to executing in the augmented mode in which ownership of the clock object is transferred to the software drive module.

* * * * *